United States Patent [19]

Wright

[11] Patent Number: 4,875,298
[45] Date of Patent: Oct. 24, 1989

[54] PREHEATER FOR CLOTHES DRYER

[76] Inventor: Robert L. Wright, 1113 Quintuplet Dr., Casselberry, Fla. 32707

[21] Appl. No.: 258,011

[22] Filed: Oct. 14, 1988

[51] Int. Cl.$^4$ .............................................. F26B 19/00
[52] U.S. Cl. .......................................... 34/86; 34/133
[58] Field of Search ................... 34/86, 133, 35, 131, 34/132, 232, 233; 165/128, 139

[56] References Cited

U.S. PATENT DOCUMENTS 4,003,139  1/1977  Van Winkle ............................ 34/86

Primary Examiner—Henry A. Bennet
Attorney, Agent, or Firm—Warren L. Franz

[57] ABSTRACT

An improved preheater for a clothes dryer delivers hot exhausted air from a dryer through a loop of tubing within a box-like housing for heat exchange with ambient air drawn through the housing. Valving is provided for selectively drawing ambient air to the housing either from conditioned space near the dryer, or from solar-heated attic space. The hottest run of the tubing loop is located downstream in the ambient air flow. In one form the box has a flanged open front for attachment over an air inlet grate located in the rear of a dryer. In another form, the box is separated from the dryer and an adapter is used to carry the preheated air to an air inlet of a dryer.

16 Claims, 3 Drawing Sheets

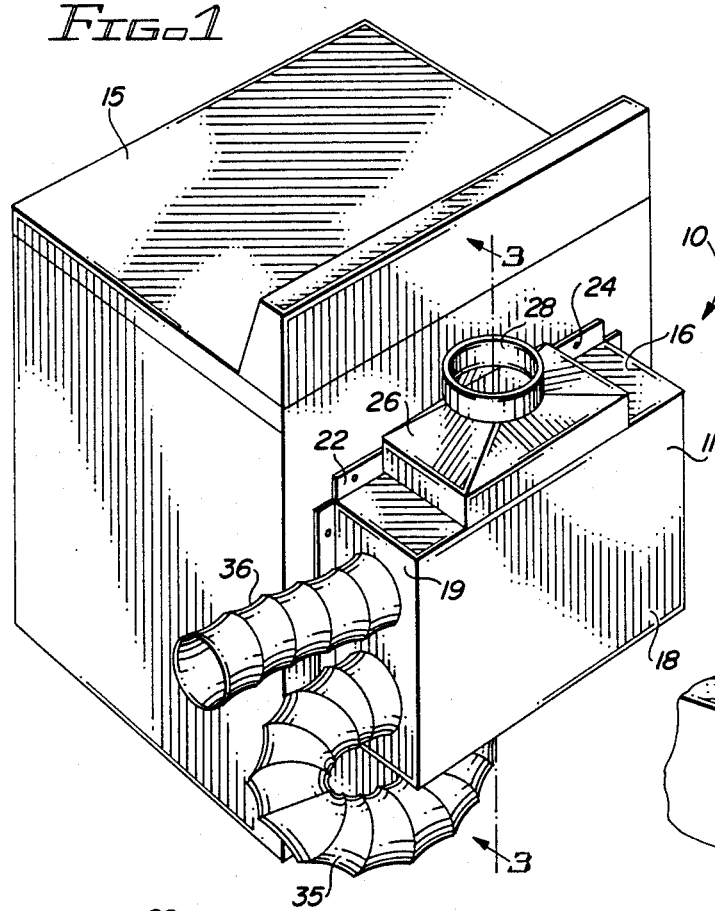
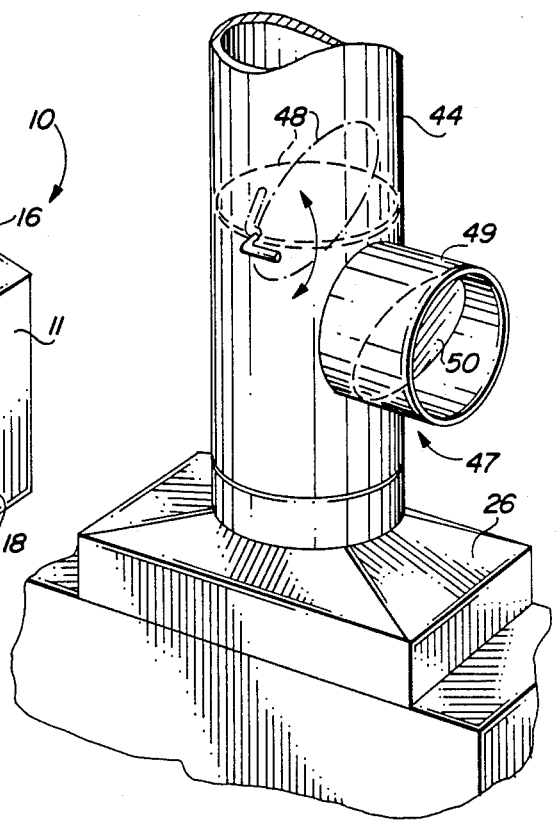
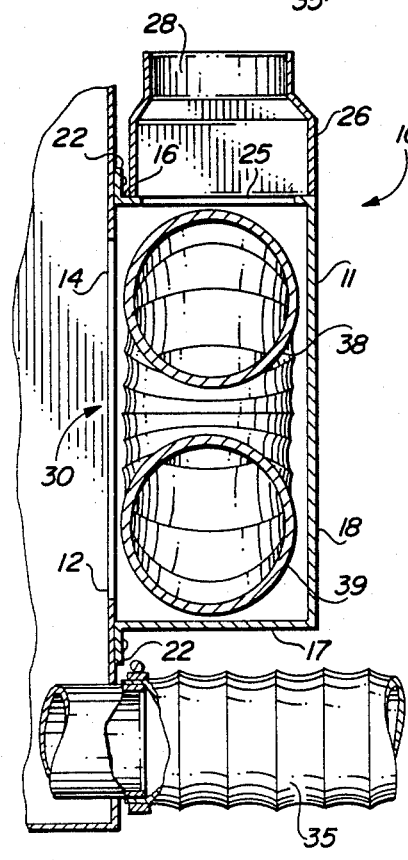
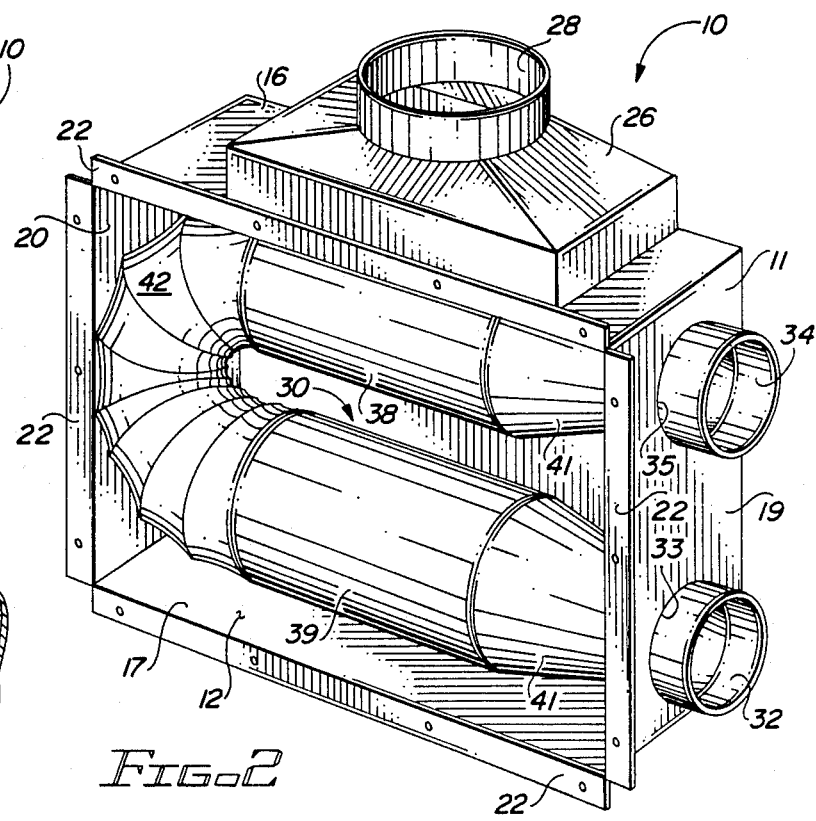

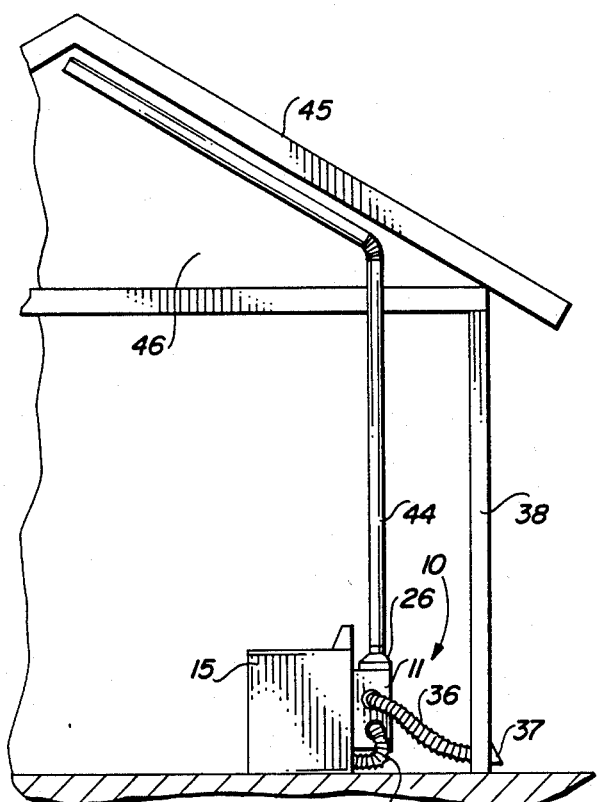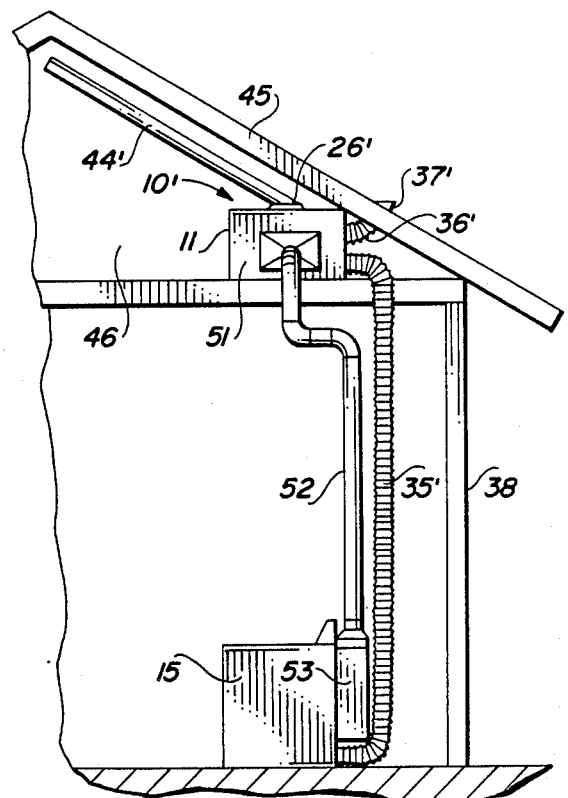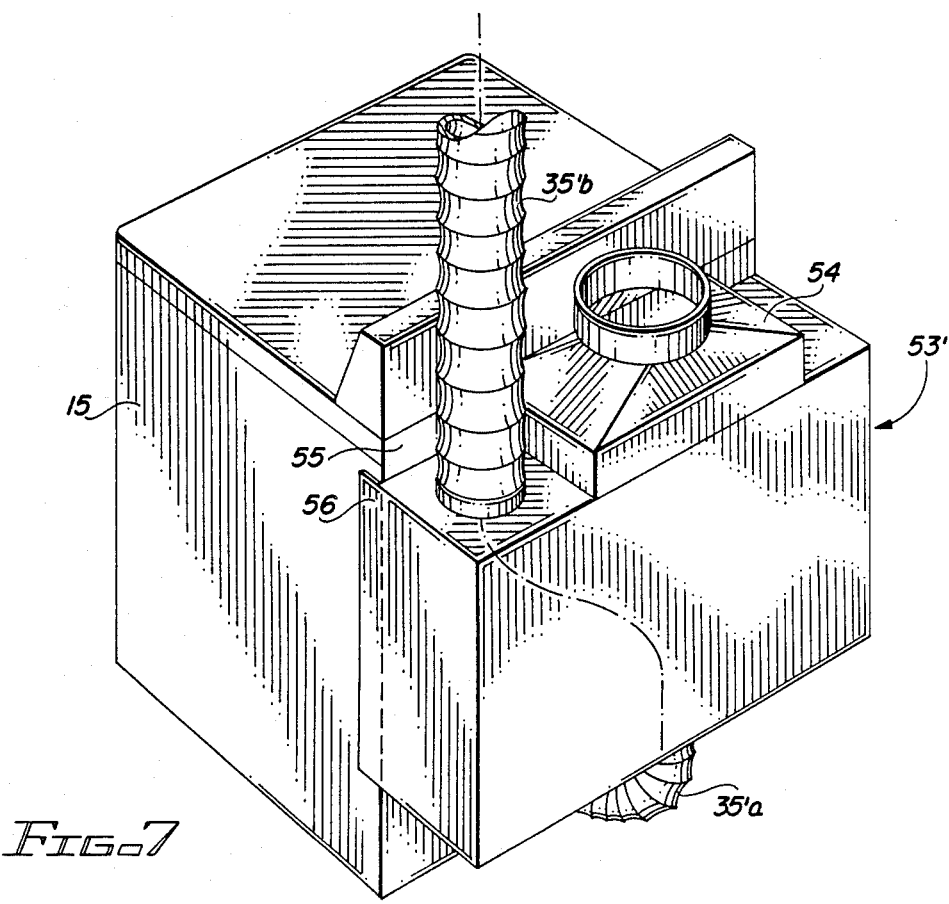

PREHEATER FOR CLOTHES DRYER

This invention relates in general to air intake preheaters for clothes dryers and the like; and, more particularly, to an improved preheater arrangement especially suitable for use with home dryers.

BACKGROUND OF THE INVENTION

Examples of heat exchange units for clothes dryers, which use the hot, moisture-laden air exhausted from a dryer to preheat the fresh, ambient air drawn into the dryer, are given in U.S. Pat. Nos. 3,859,735; 4,028,817; 4,063,590 and 4,095,349. Such prior art arrangements place an ambient air flow intake conduit in heat exchange relationship with an air flow discharge conduit, so that heat is transferred from the hot exhausted air to preheat the ambient intake air, thus reducing the energy requirements of the dryer.

In the '735 patent, for example, ambient air is preheated by drawing it through upper and lower openings of an elongated shell housing across parallel spaced runs of straight tubing that carry hot exhaust air from the bottom to the top of the housing. In the '530 patent, ambient air is preheated by drawing it through spaced straight channels formed by one side of a corrugated partition which are in heat exchange relationship with intermediate spaced straight channels formed by the other side of the partition and through which hot exhaust air passes. The '590 patent shows a similar arrangement wherein a heat exchange unit is divided by plates into a plurality of sets of alternating first and second straight passageways for directing the hot exhaust air perpendicularly in heat exchange relationship through the ambient inflowing air. And, the '817 patent structure directs the ambient air through parallel tubes along straight paths perpendicular to the flow of exhaust air through the housing of an exhaust air conduit.

In each case, ambient air is flowed through a first conduit in heat exchange relationship with hot exhaust air flowed through a second conduit, one of the conduits being directed along a straight path through the other. Although the prior art structures show the ambient air flows and hot exhaust air flows in longitudinal as well as transverse heat exchange encounters, one conduit does not loop or double back to recross the other to provide multiple transverse crossings of one flow stream relative to the other.

The described structures, also, all show ambient air being drawn from an area adjacent the dryer. This may not be a problem for commercial dryers located in unconditioned space or for which air is drawn from the unconditioned interior of enclosures into which the backs of the dryers are built. For a home dryer located in an air-conditioned area this may be a problem, however. It does not make sense in summer, for example, for the homeowner to have to pay to cool down the air in the room, then to draw it into the dryer and have to pay to heat it up again. Moreover, when conditioned air is taken out of the room into the dryer, the unconditioned hot air drawn into the room from outside has to be cooled down.

U.S Pat. No. 4,279,082 addresses this problem by providing an air inlet construction for a domestic clothes dryer which has a pair of selectively usable air inlet ports. One port opens outwardly to draw ambient air from the area immediately adjacent the dryer; the other connects by means of a duct to draw air from a solar heated ridge portion of an unconditioned attic area. The '082 air inlet, however, makes no accommodation for preheating the intake air by means of the exhausted air.

SUMMARY OF THE INVENTION

It is an object of the present invention to provide an economical preheater with improved efficiency suitable for home dryer use.

It is another object of the invention to provide a dryer preheater having means for selectively drawing ambient air from an area adjacent a dryer or from an unconditioned area, such as the solar heated ridge area of an attic space.

In one aspect of the invention an intake conduit in the form of a box delivers air from an ambient air intake port to a dryer mounted air intake port. Air vented from the dryer is flowed within a conduit that passes within the air intake box to provide an exhausted air flow path that doubles back on itself permitting multiple heat exchange experiences between the ambient air and the exhausted air, as the ambient air travels through the box.

In a preferred embodiment, described in greater detail below, an open sided rectangular box is provided with means for mounting over the air intake grate of a conventional home dryer. Exhausted air from the dryer outlet port is vented through the box by means of a conduit which makes at least one loop therein into the path of the incoming ambient air.

In another aspect of the invention the intake of the preheater is connected to deliver the ambient air in the form of warm attic air to the dryer. An optional fitting may be provided to select whether the intake air is drawn from the attic space, or from the dryer room.

Another form of preferred embodiment takes the form of a rectangular box which is separated from the dryer and may be located either in the attic space or at another convenient location.

BRIEF DESCRIPTION OF THE DRAWINGS

Embodiments of the invention have been chosen for purposes of illustration and description, and are shown in the accompanying drawings, wherein:

FIG. 1 is a rear perspective view of an embodiment of the invention shown in use with a conventional home dryer;

FIG. 2 is a front perspective view of the embodiment of FIG. 1;

FIG. 3 is a section view taken along the line 3—3 of FIG. 1;

FIG. 4 is a fragmentary view of a valving arrangement for the intake port;

FIG. 5 is a schematic view of the embodiment of FIG. 1 showing its connection for drawing air from an attic space;

FIG. 6 is a view similar to that of FIG. 5, showing possible positioning of an alternate embodiment of the invention;

FIG. 7 is a view of an alternative form of adapter 53 of FIG. 6;

Throughout the drawings, like elements are referred to by like numerals.

DESCRIPTION OF THE PREFERRED EMBODIMENTS

Figure 8:
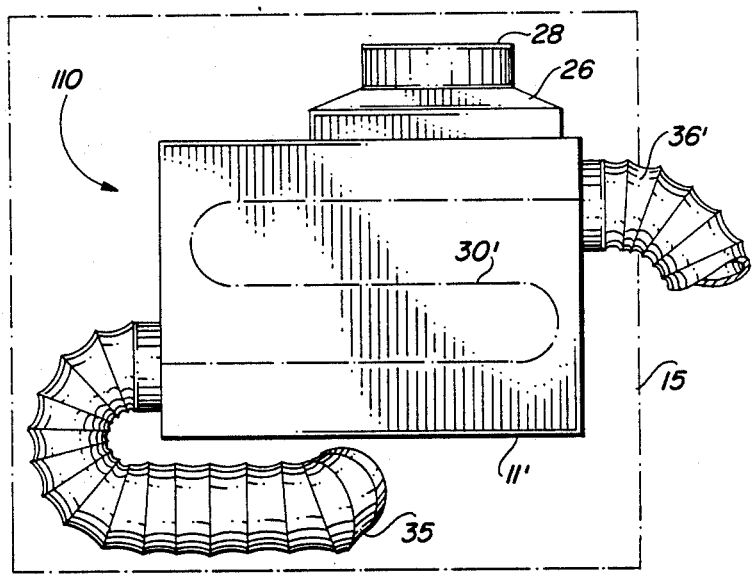
FIG. 8 is a view of a modified form of the embodiment of FIGS. 1-3.

The principles of the invention are described with reference to embodiments thereof suitable for use with conventional home clothers dryers. Those skilled in the art to which the invention relates will, however, appreciate that the same principles may be applied to commercial dryers.

As shown in FIGS. 1-3, a preheater 10 comprising an open rectangular shell housing or box 11 is shown mounted with a front opening 12 brought flush against the grate of an ambient air intake opening 14 (FIG. 3) of a conventional home clothes dryer 15.

The box 11 is formed of one or more pieces of and has rectangular top 16, bottom 17, rear 18, left side 19 and right side 20 panels, as shown. The front edges of the panels 16, 17, 19 and 20 have outwardly turned perpendicular flange sections 22 which provide a peripheral margin or border to the opening 12 and aid in the attachment of the box 11 by means of fasteners 24 (FIG. 1), or the like, to the back of the conventional dryer 15.

The top 16 of the box 11 is provided with an opening 25 (FIG. 3). The opening 25 preferably takes the form of a rectangular opening extending for a major portion of the top 16. A boot 26, having a rectangular bottom opening matching the opening 25 and an upper round opening 28 which serves as the ambient air intake port for the device 10, is mounted by suitable fastening means to the top 16 above the opening 25.

The internal compartment of the preheater box 11 is occupied by an exhaust air conduit 30 (see FIGS. 2 and 3) having one or more loops, as shown, for directing a flow of exhaust air vented from the dryer 15 back and forth through the box 11, making multiple passes in series across the incoming air path entering the opening 28 of the boot 26. For the embodiment shown in FIGS. 1-3, the conduit 30 comprises a single U-shaped loop of tubular configuration with a hot exhaust air entry port 32 (FIG. 2) placed through a lower matching opening 33 in the left side 19 of the box 11 and an exhaust air exit port 34 vented through a corresponding matching upper opening 35 in the same side 19. The size of the tubular sections of the conduit 30 within the interior of the box 11 are chosen to fill a major portion of the internal cavity. The portions of tubing of the conduit 30 at the ports 32 and 34 are chosen to match the dimension of conventional dryer vent tubing 35, 36 which connects the lower run of the conduit 30 with the dryer exhaust air discharge port (not shown) and the upper portion of the conduit 30 with a conventional dryer exhaust air discharge vent 37 (see FIG. 5) which opens to the outside of a building 38 within which the dryer 15 may be located.

A suitable embodiment of the preheater 10 of FIGS. 1-3 may be constructed from an sheet metal box 11 having a 22¼" length, 8" depth and 15½" height. The boot 26 may conveniently be a 6"×14"×8"round sheet metal boot. The conduit 30 may be comprised of 28-30 gauge 6" round galvanized sheet metal pipe sections connected at their left ends by means of 6" to 4" reducers 41 to 4" flexible vent tubing 35, 36, and at their right ends to two 6"adjustable 90° elbows 42, trimmed as needed to complete the loop from the intake port 32 to the exit port 34. The opening 25 in the top 16 may be a 6"×14" 14" opening positioned above the overlying tubing sections 38, 39, so that air drawn into the box 11 drawn across the tubular sections 38, 39 of the conduit 30, through the grate 14 (FIG. 3), and into the drum area of the dryer 15.

The ports 32 and 34 are connected to the flexible tubing 35 and 36, so that the exhaust air closest to the dryer exit will be downstream in the flow of ambient air into the dryer. This assures, during the heat exchange process, that the hotter vented air will be in contact with the hotter preheated air, and the cooler vented air will be in contact with the cooler ambient air. Such an arrangement results in greater heat transfer efficiency.

In the shown arrangement, the tubing section 39 is advantageously spaced about 1" above the box bottom 17 and about 1" from the rear 18. The rightmost extent of the elbows of the loop 30 comes within a small gap spacing of the right sidewall 20. The boot 26 may be spaced 1¼" from the flange 22 and ¼" from the rear edge of the top 18. An objective of the arrangement is to get the ambient air inflowing trough the opening 28 of the boot 26 into contact with a sufficient surface area of the conduit 30 to provide an efficient heat exchange. The ambient air flows down through the boot 26 around the upper and lower runs of the loop of conduit 30 and into the dryer 15.

The tubing pieces 38, 39, 41 and 42 are connected with their crimped ends inserted into adjacent pieces, the crimp being downstream so that the crimp is taken with the air flow. It has been found advantageous to use aluminum foil tape of a type commercially available for securing the boards of air-conditioning ducts, to secure the junctures between adjacent portions of the conduit 30. The same tape can be used for securing the boot 26 to the top 16 of the box 11 and securing the box 11 to the rear of the dryer 15.

If ambient air is brought into the opening 28 at a temperature of 68° F. and an inflow rate of 175 cu. ft./min. for a dryer temperature cycle of 120°-155° F., the arrangement shown has been demonstrated to provide a better than 15° F. heat-up.

FIG. 4 illustrates a modification whereby a length of piping 44 is connected above the boot opening 28 to an intake port located adjacent the ridge of a roof 45 (FIG. 5) in an attic space 46. This permits ambient air to be drawn from the solar heated hot ambient air located in the attic space of a building 38. A "T"-connection 47 (FIG. 4) of commercially known design and having a valve in the form of a movable damper vane 48 permits a user to select between drawing ambient air either from the attic space 46 by the tube 44 (dashed vane position in FIG. 4) or drawing it from the conditioned space adjacent the dryer through the perpendicular pipe section 49 (dot-dashed vane position). A manual or barometric vane 50 positioned within the section 49 serves to releasably block the intake of air through that section.

FIG. 6 illustrates an alternate embodiment preheater 10' in which the box 11 is located remotely from the dryer 15 and includes a front panel 51 to cover the opening 12 which would otherwise be flush with the back of the dryer unit 15. The box 10' is modified to provide an exit point in the front 51 for a conduit 52 which takes the preheated ambient air down to the grate 14 (FIG. 3) of the dryer 15. An adapter 53 in the form of a hollow open-front box joins the rear of the dryer 15 to provide the connection between the base of the conduit 52 and the grate 14. The boot 26 of the embodiment of FIGS. 1-3 can be replaced by a boot 26' to provide a different attachment angle or configuration for the intake of air. The configuration of alternate boot 26' shown in FIG. 6 comes off at a 45° angle to provide for connection of a length of piping 44' between an attic ridge intake area and the boot. Other suitable locations for a remote unit 10' such as that shown in FIG. 6, can be against the wall of the room in which the unit 15 is located, or against one of the dryer sides other than the rear which has the grate opening 14.

An alternative slim-line form of adapter 53 of FIG. 6 is shown by the adapter 53' in FIG. 7. Like adapter 53, adapter 53' has an open-box configuration with a front opening brought flush against the grate ambient air intake opening at the back of the dryer 15. However, to conserve space so that the dryer may be pushed back closer to the wall 38, the exhaust air conduit 35' (see FIG. 6) that carries the hot air exhausted from dryer 15 to the preheater 10' is channeled through the adapter 53 from a lower section 35a' to an upper section 35b', as shown. The conduit 35' may be a continuous piece of flexible vent pipe as in FIG. 6 except that it passes through the interior of the box 53', or it may have a separate flexible or rigid tubular portion within the box 53'. As with the adapter 53, a boot 54 provides a transition from an opening in the top of adapter 53' to the conduit 52. Flanges 55, 56 are provided to bring the adapter flush with the back of the dryer 15 with the assistance of duct tape or other suitable fastening means.

FIG. 8 illustrates another form of preheater unit 110 of the invention showing a conduit 30' that has a plurality of loops for multiple recrossing heat exchange experiences of the incoming air with the exhausting air. The configuration shown in FIG. 8 has two loops, providing for three passes in series of the spent air from the vent 35 across the path of the inflowing air within the box 11'. Because of the existence of four 90° bends (two U-loops) in the conduit 30', venting pipe 36' connects at the opposite side of the box 11' from the vent tubing 35.

The boxes of preheater units 10, 110 (or the boxes of adapters 53, 53') can be made adaptable so the same unit is usable for different dryer models. Home dryers 15 tend to be of more or less uniform width from side to side; however, there is some variation in dimensioning and configuration of different rear air intake grates, and some models even take air in at another location. To accommodate different dryer rear intake configurations, the box depth can be made variable by making the box in two sections, one rearwardly telescoping relative to the other. Accommodation of different air intake locations is illustrated by way of example by the modified form of preheater 210 shown in FIG. 9.

Figure 9:
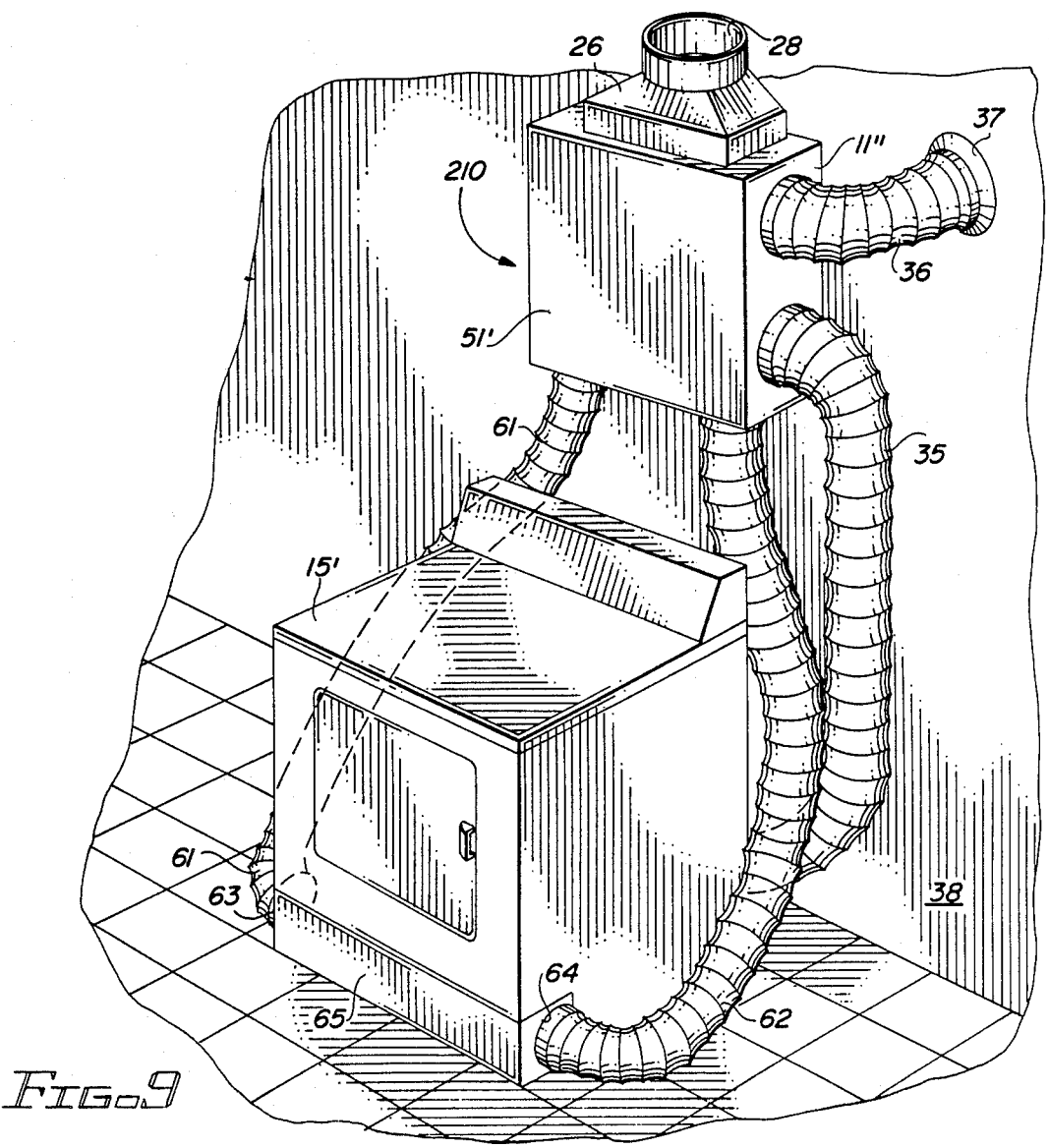
FIG. 9 is a further modified form of the embodiment of FIGS. 1-3.

FIG. 9 shows a preheater unit 210 suitable for use with a dryer 15' having an air intake opening located in a recessed location adjacent the floor at the front of the dryer. The preheater has a box 11'' positioned on wall 38 at a location above the dryer 15' and through which hot exhaust air flows in heat exchange relationship with ambient air drawn into the box, in a manner similar to that previously described for the preheater 10 of FIGS. 1-3.

The box 11' has been modified relative to the box 11, however, by covering the front opening 12 with a solid panel 51' and by providing two openings adjacent opposite sides of the bottom panel 17 from which the preheated ambient air is drawn into the dryer by means of disposed lengths of flexible vent tubing 61, 62 which connect to opposite end openings 63, 64 of a hollow box adapter 65 which fits into the recessed air intake area at the front of the dryer 15' and has a rear opening for delivering the air from conduits 61, 62 into the dryer.

A preheater provided in accordance with the principles of the invention as exemplified by the foregoing embodiments provides an economical, efficient energy-saving device suitable for home usage. During hot weather attic temperatures of 125°-130° may be sufficiently high so that the ambient air does not have to be heated in the dryer at all for the drying process, i.e. the dryer heating element may never initiate. This extends the life of the dryer heater element and of the electronic components for controlling the same. During cold weather, however, or where air is drawn from a cooler location, some of the heat of the exhaust air can be transferred by means of the looped conduit 30 or 30' to the inflowing air without increasing its moisture content, thereby saving energy. Also, drawing air from the attic space 46 rather than from the conditioned space in which the dryer may be located will have a two-pronged effect resulting in savings in utility bills; the homeowner will not have to pay to heat air which he has already paid to cool; and cool air drawn from the room will not result in its replacement by hotter air from outside which then has to be cooled. Further, the length of conduit 36 for the configuration of FIG. 5 between the dryer and the outlet 37 will be cooler for the length from the dryer to the wall, and thus heat up the air-conditioned space less (where the length 35 is shorter than the normal run length) than would otherwise be the case, the exhausted air giving up some of its heat to the incoming air.

Those skilled in the art to which the invention relates will see other advantages and benefits of the present invention.

The piping and other components are suitably chosen to be made of galvanized sheet metal or plastic, though other materials are possible. The external conduit materials such as box 11 and boot 26 may be chosen to be made of or at least optionally covered with insulating materials, such as air-conditioning fiberglass duct board as, for example, Owens-Corning type 475-FRK or other commercially available materials. The inner conduit 30 should be selected from a good heat transmitting material. The conduit 30 and other tubular conduits can be chosen to have circular, rectangular or other cross-sectional shape, as desired.

The portion of conduit 30 formed by the elbows 92 can be formed, if desired, by a single piece of close radius U-bend tubing. It will also be appreciated that the straight runs of tubing 38, 39 (FIG. 2) within the box 11 may also, optionally, be provided with radial fins (not shown) to provide a greater surface area to radiate heat into the incoming stream. The arrangement shown in FIG. 4 for the vane damper 48 may also be replaced by any of the known damper mechanisms or moisture responsive mechanisms for selecting between an attic space intake and intake from another location.

It will be appreciated that filters may be provided within one or more of the conduits 35, 36, 44 or 52 to control the entry and exit of materials through the ducting system. Conventional technology can, for example, be used to incorporate a beeper such as used on some dryers to indicate that cleaning is needed for a lint screen, to indicate when the filter needs clearing or replacement. Arrangements that draw air from the attic space should have at least a wire screen or cross filter at a high point to prevent the entrance of bugs, rodents or other pests that may occasionally find their way into an unoccupied attic.

It will also be appreciated that the preferred embodiments of the invention described above are just examples of how the invention can be implemented, and that various substitutions and modification may be made therein without departing from the spirit and scope of the invention as defined by the claims below.

What is claimed is:

1. In an air intake preheater for a clothes dryer or the like, in which hot, moisture-laden air exhausted from the dryer is used to preheat fresh, ambient air drawn into the dryer, the preheater having a first conduit connected for flowing the exhausted air from the dryer to a discharge point, and a second conduit connected for flowing the ambient air, in heat exchange relationship with the exhausted air flowed through the first conduit, from a source of ambient air to the dryer, the first and second conduits communicating in air flow relationship through the dryer, the improvement comprising:

the first conduit being directed through the second conduit along a looping path that provides first and second transverse crossings in series in opposite directions of the air flow in the first conduit relative to the air flow in the second conduit, the first crossing being downstream of the second crossing in the air flow in the second conduit, the first conduit being connected at its first crossing to the dryer and at its second crossing to the discharge point.

2. An improvement as in claim 1, wherein the second conduit is connected for flowing the ambient air from a first source of ambient air adjacent the dryer and from a second source of ambient air remote from the dryer; and further comprising valve means operatively associated with the second conduit for flowing the ambient air from a selected one of the two sources.

3. An improvement as in claim 1, wherein the first conduit comprises a loop of tubing and the second conduit comprises a box-like housing.

4. An improvement as in claim 3, wherein the housing is an open box-like housing having a top with an opening, a front with an opening and first and second sides, the top opening being connected to draw the ambient air from the source and the front opening being connected to deliver the ambient air after preheating to the dryer; and wherein the tubing comprises a loop of circular cross-sectioned tubing that extends from side-to-side across said housing and back again.

5. In an air intake preheater for a clothes dryer or the like, in which hot, moisture-laden air exhausted from the dryer is used to preheat fresh, ambient air drawn into the dryer, the preheater having a first conduit connected for flowing the exhausted air from the dryer to a discharge point, and a second conduit connected for flowing the ambient air, in heat exchange relationship with the exhausted air flowed through the first conduit, from a source of ambient air to the dryer, the improvement comprising:

the second conduit comprising an open box-like housing having a top with an opening, a front with an opening, and first and second sides, the top opening being connected to draw the ambient air from the source and the front opening being connected to deliver the ambient air after preheating to the dryer; and the first conduit comprising a loop of tubing that extends from side-to-side across the housing and back again;

wherein the portion of the tubing loop extending from side-to-side across the housing is connected to the dryer and the portion of the tubing loop extending back again is connected to the discharge point; the portion extending back again being located closer to the housing top opening than the portion extending across; the tubing being directed through the housing along a path that provides first and second transverse crossings in series in opposite directions of the air flow in said tubing relative to the air flow in the housing, the first crossing being downstream of the second crossing in the air flow in the housing.

6. An improvement as in claim 5, for use with a dryer having a rear surface with an air intake opening therein, and wherein the housing is dimensioned and configured to be mounted against the rear surface of the dryer, with the front opening of the housing covering the dryer air intake opening.

7. An improvement as in claim 6, wherein the housing has outwardly turned flanges bordering said front opening, the flanges being dimensioned and configured to fit in flush contact with the rear surface of the dryer.

8. An air intake preheater for a clothes dryer or the like, in which hot, moisture-laden air exhausted from the dryer is used to preheat fresh, ambient air drawn into the dryer, the preheater comprising:

a first conduit in the form of a tubular section connected for flowing the exhausted air from the dryer to a discharge point; and a second conduit in the form of a box-like housing for flowing the ambient air, in heat exchange relationship with the exhausted air flowed through the first conduit, from a source of air to the dryer, the first conduit communicating in air flow relationship with the second conduit through the dryer;

the first conduit looping through the second conduit along a path that provides transverse crossings in series in opposite directions of the exhaust air flow relative to the ambient air flow; the first conduit being connected to the dryer at a first crossing and being connected to the discharge point at a second crossing, the first crossing being located downstream of the second crossing in the ambient air flow path.

9. A preheater as in claim 8, wherein the second conduit comprises a shell housing having a generally vertical planar configuration with rectangular top, bottom, rear, left side and right side panels, with an ambient air intake opening in the top of the box and having an opening for exiting the ambient air after preheating to the dryer; and wherein the first conduit comprises a loop of tubing that lies generally in the plane of the second conduit housing and has a lower run of the loop extending from side-to-side across the housing for connection to receive exhausted air from the dryer and an upper run of the loop extending back across the housing to deliver the exhausted air to the discharge point.

10. A preheater as in claim 9, for use with a dryer having a rear surface with an air intake opening therein, wherein the housing has an open front that serves as the ambient air exiting opening of the housing, and further comprising flange means for mounting the housing with its open front flush against the rear surface of the dryer.

11. A preheater as in claim 9, for use with a dryer having a surface with an air intake opening therein, wherein the housing further includes a front panel, and further comprising means for connecting the housing exiting opening for flowing ambient air after preheating to the air intake opening of the dryer.

12. A preheater as in claim 11, wherein the connecting means comprises an adapter having an air intake port and an air exit port, the adapter being dimensioned and configured for mounting with its exit port in ambient air transmission communication with the dryer intake opening; and means for communicating preheated ambient air from the housing exiting opening to the adapter air intake port.

13. A preheater as in claim 9, further comprising means for connecting the top opening to a first source of ambient air adjacent the dryer and to a second source of solar-heated ambient air remote from the dryer; and valve means operatively associated with the connecting means for flowing the ambient air from a selected one of the two sources to the housing through the top opening.

14. In combination with a clothes dryer having an air inlet for drawing fresh, ambient air into the dryer and an air outlet, in air flow communication through the dryer with the air inlet, for exhausting hot, moisture-laden air from the dryer, apparatus for preheating the indrawn ambient air with the heat of the exhausted air, the preheater comprising:

- a rectangular box-like housing having a discharge port connected to the dryer inlet and an intake port connected to a source of ambient air;
- a tube having an intake port connected to the dryer outlet and a discharge port connected to a discharge point and having a looped section located within the housing; the looped section functioning to carry the exhausted air from the dryer outlet, in heat exchange relationship with the ambient air drawn into the dryer inlet, along a path that provides oppositely directed transverse crossings in series of the exhaust air flow relative to the ambient air flow.

15. A preheater as in claim 14, further comprising:
- a first conduit connecting the housing intake port for drawing ambient air from a first source adjacent the dryer and a second conduit connecting the housing intake port for drawing ambient air from a second source remote from the dryer; and valve means operatively associated with the first and second conduits for flowing the ambient air from a selected one of the sources to the housing intake port.

16. A preheater as in claim 15, wherein the second source comprises a source of air in an attic space of a building.

* * * * *